United States Patent
Lim et al.

(10) Patent No.: US 11,024,871 B2
(45) Date of Patent: Jun. 1, 2021

(54) BATTERY MODULE FOR SECONDARY BATTERY

(71) Applicant: SK INNOVATION CO., LTD., Seoul (KR)

(72) Inventors: Ji Hoon Lim, Daejeon (KR); Kwan Yong Kim, Daejeon (KR); Tae Gu Lee, Daejeon (KR); Jae Il Hwang, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 174 days.

(21) Appl. No.: 16/139,905

(22) Filed: Sep. 24, 2018

(65) Prior Publication Data

US 2019/0103624 A1    Apr. 4, 2019

(30) Foreign Application Priority Data

Sep. 29, 2017   (KR) .................... 10-2017-0127751

(51) Int. Cl.
| | | |
|---|---|---|
| *H01M 10/04* | (2006.01) | |
| *H01M 10/613* | (2014.01) | |
| *H01M 2/02* | (2006.01) | |
| *H01M 10/647* | (2014.01) | |
| *H01M 10/6553* | (2014.01) | |

(Continued)

(52) U.S. Cl.
CPC ....... *H01M 10/045* (2013.01); *H01M 10/049* (2013.01); *H01M 10/0413* (2013.01);
(Continued)

(58) Field of Classification Search
CPC ...... H01M 10/045; H01M 2/206; H01M 2/30; H01M 10/647; H01M 10/6553;
(Continued)

(56) References Cited

U.S. PATENT DOCUMENTS

| | | | | |
|---|---|---|---|---|
| 2006/0269831 A1* | 11/2006 | Kim | ...................... | H01M 2/021 429/62 |
| 2011/0200866 A1* | 8/2011 | Yun | ....................... | H01M 2/206 429/158 |

(Continued)

FOREIGN PATENT DOCUMENTS

| | | |
|---|---|---|
| KR | 10-2013-0085930 A | 7/2013 |
| KR | 10-1298849 B1 | 8/2013 |

(Continued)

OTHER PUBLICATIONS

Bang KR 2017-002158, English machine translation (Year: 2017).*
Yoshioka KR 2013-0085930, English machine translation (Year: 2013).*

*Primary Examiner* — Lisa S Park
(74) *Attorney, Agent, or Firm* — IP & T Group LLP

(57) ABSTRACT

Provided is a battery module for a secondary battery. The battery module includes a busbar for a connection of electrode tabs. According to exemplary embodiments of the present disclosure, in a battery module for a secondary battery, a thickness of a welded portion may be reduced while maintaining a total cross-sectional area of a busbar when electrode tabs of each of secondary batteries are connected in series or in parallel by a laser welding. Thus, the battery module may have an enhanced welding quality, and also may have an effect of being applicable to a high-capacity battery or a battery that is used for a long period of time.

12 Claims, 12 Drawing Sheets

(51) Int. Cl.
*H01M 50/502* (2021.01)
*H01M 50/543* (2021.01)
*H01M 50/557* (2021.01)

(52) U.S. Cl.
CPC ....... *H01M 10/613* (2015.04); *H01M 10/647* (2015.04); *H01M 10/6553* (2015.04); *H01M 50/502* (2021.01); *H01M 50/543* (2021.01); *H01M 50/557* (2021.01); *H01M 2220/20* (2013.01)

(58) Field of Classification Search
CPC ........... H01M 10/0413; H01M 2/0212; H01M 2/021; H01M 10/049; H01M 10/613; H01M 2220/20; H01M 2/22; H01R 25/16
See application file for complete search history.

(56) References Cited

U.S. PATENT DOCUMENTS

| 2015/0079453 | A1† | 3/2015 | Choi | |
|---|---|---|---|---|
| 2016/0248068 | A1* | 8/2016 | Ha | H01M 2/1016 |
| 2017/0170445 | A1* | 6/2017 | Kim | B23K 20/10 |

FOREIGN PATENT DOCUMENTS

| KR | 1020150137840 A | † | 12/2015 |
|---|---|---|---|
| KR | 10-2017-0021058 A | | 2/2017 |
| KR | 1020170021697 | * | 2/2017 |
| KR | 1020170021697 A | † | 2/2017 |

\* cited by examiner
† cited by third party

BATTERY MODULE FOR SECONDARY BATTERY

CROSS-REFERENCE TO RELATED APPLICATIONS

This application claims priority under 35 U.S.C. § 119 to Korean Patent Application No. 10-2017-0127751, filed on Sep. 29, 2017, in the Korean Intellectual Property Office, the disclosure of which is incorporated herein by reference in its entirety.

TECHNICAL FIELD

The following disclosure relates to a battery module for a secondary battery, and more particularly, to a battery module for a secondary battery which includes a busbar for a connection of electrode tabs.

BACKGROUND

Recently, electric vehicles that are zero-emission vehicles are attracting attention in order to prevent air pollution due to harmful components of internal combustion engine vehicles.

Substantially, a secondary battery having a high performance, such as a high energy density, a high output density, a long life, a weight lightening, and the like, is essential for driving an electric vehicle. To this end, lead secondary batteries, lithium secondary batteries, alkali secondary batteries, metal-air secondary batteries, fuel secondary batteries, and the like are being developed or used. In addition, since a performance of a single secondary battery is insufficient, a plurality of secondary batteries are connected in series and configured and used to generate a voltage as high as a few hundreds of volts. In each of the secondary batteries, a terminal of a positive electrode and a terminal of a negative electrode are generally fixed and mounted, and a plurality of secondary batteries are integrated into one tray and are being used.

Thus, in a single large-capacity secondary battery (hereinafter, referred to as a "battery"), a plurality of battery cells are connected to each other in series or in parallel.

Here, the battery includes electrode tabs formed to electrically connect a plurality of cells, and a busbar is used to connect the electrode tabs to each other in series or in parallel. The busbar is a kind of jigs for directly or indirectly connecting electrode tabs to each other, and is used to connect electrode tabs using a laser welding, an ultrasonic welding or a spot welding, or using fasteners, such as bolts, rivets, and the like.

Recently, a connection method using a fastener having an increased weight and a difficulty in securing a space is avoided, and a connection method using a laser welding that saves time and that is excellent in a welding quality among welding methods is gaining attention.

A laser welding refers to a method of irradiating a laser to one of a pair of welding targets to be welded in a state in which the welding targets face each other, and of melting a portion in which the welding targets are in contact with each other so that the welding targets are attached to each other. However, in the laser welding, a welding quality is excellent when a thickness of a welding target to which a laser is irradiated is less than a thickness of a welding target to which a laser is not irradiated, and otherwise an issue of a decrease in the welding quality occurs because a hole is formed in the welding target to which the laser is not irradiated.

Meanwhile, FIG. 1 shows a configuration in which a busbar is laser-welded to upper sides of electrode tabs in a state in which the electrode tabs are bent and connected.

Since a welding is performed by irradiating a laser in a side of a busbar in the above welding method, a welding quality is reduced when a thickness of the busbar is greater than a thickness of an electrode tab. Thus, the busbar needs to be configured to be thin. However, when the thickness of the busbar decreases, an issue that it is impossible to apply the busbar to a high-capacity battery or a battery used for a long period of time occurs.

SUMMARY

An exemplary embodiment of the present disclosure is directed to providing a battery module for a secondary battery which may increase a laser welding quality by reducing a thickness of a welded portion of a busbar and which may also be applicable to a battery that has a high capacity and that is used for a long period of time by allowing a total cross-sectional area of the busbar to be maintained, by applying a busbar welding scheme using bending of an electrode tab.

In one general aspect, there is provided a battery module for a secondary battery, the battery module with a plurality of secondary batteries and electrode tabs extending from each of the secondary batteries and welded to each other, the battery module including a busbar disposed in close contact with an electrode tab connection portion, to perform a laser welding of an electrode tab and a neighboring electrode tab, wherein the busbar includes a welding groove formed to be recessed in a laser-welded portion, and wherein an average thickness of the busbar is greater than a thickness of the electrode tab, and a thickness of a side of the busbar in which the welding groove is formed is less than the thickness of the electrode tab.

In the battery module, a plurality of electrode tabs may be connected to one busbar, and at least one welding groove may be formed.

A laser-welded portion of the welding groove may be formed along the electrode tab.

The battery module may be applied to a battery module including a pouch cell in which an electrode tab protrudes.

The electrode tab and the neighboring electrode tab may be bent to face each other in the electrode tab connection portion. When the electrode tab protrudes from an upper side of a secondary battery, the busbar may be disposed to face an upper side of the electrode tab connection portion. The electrode tab connection portion and the busbar may be welded using a laser irradiated from a laser irradiator located above the busbar.

The welding groove may be formed to have a predetermined width in a longitudinal direction of the electrode tab.

The welding groove may be formed so that both longitudinal end portions of the welding groove may be spaced apart inwardly by a predetermined distance from end portions of the busbar.

The busbar may further include a heat dissipation groove formed to be recessed adjacent to the welding groove.

A cross section of the welding groove may have a rectangular shape, or a trapezoidal shape having a width decreasing downwardly.

The heat dissipation groove may have an uneven portion formed on an inner surface.

DETAILED DESCRIPTION OF EMBODIMENTS

A secondary battery that is a basic configuration of a battery module will be briefly described, prior to describing a battery module according to an exemplary embodiment of the present disclosure.

Figure 1:
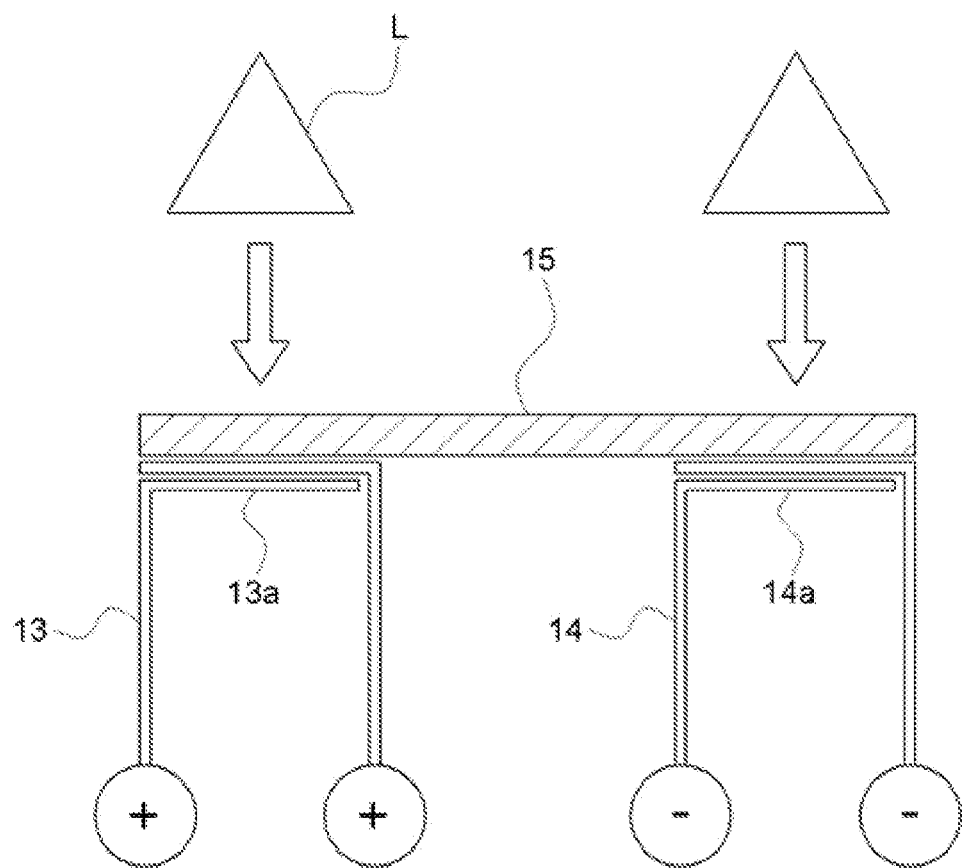
FIG. 1 is a view schematically illustrating a connection of electrode tabs using a conventional laser welding.
Figure 2:
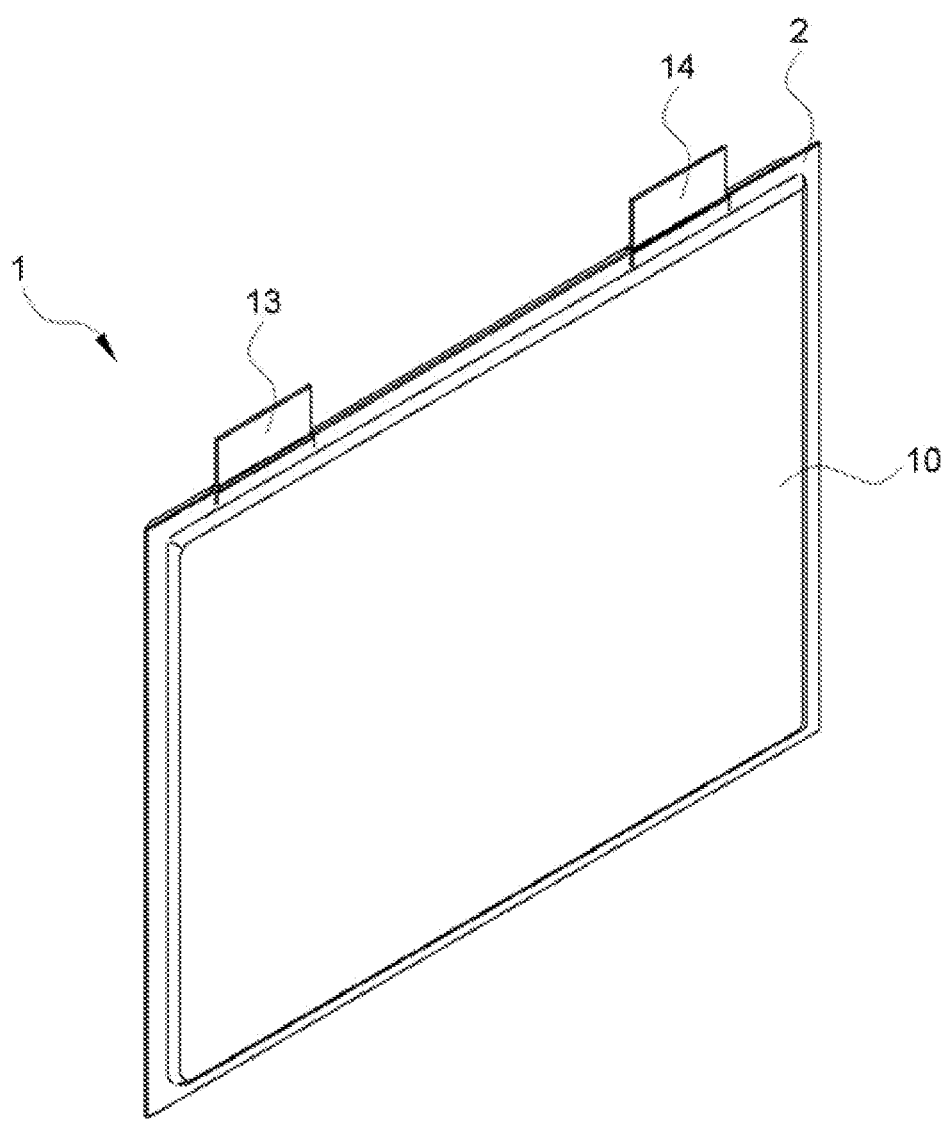
FIG. 2 is a perspective view illustrating a typical secondary battery.

FIG. 2 is an overall perspective view illustrating a general secondary battery 1.

As shown in the drawing, the secondary battery 1 includes an electrode assembly 10, a case 2 that provides a space in which the electrode assembly 10 is accommodated, and a non-aqueous electrolyte (not shown) that fills the case 2. In the electrode assembly 10, a plurality of positive electrode plates and a plurality of negative electrode plates may be alternately stacked and may be separated by a separator. Each of the positive electrode plates and the negative electrode plates transfers or receives a current via electrode tabs 13 and 14 exposed to the outside of the case 2. Although both the electrode tabs 13 and 14 are disposed in one side of the case 2 in a configuration of the secondary battery 1 as shown in the drawing, the electrode tabs 13 and 14 may be formed in opposite sides of the case 2, respectively.

Since a performance of such a single secondary battery is insufficient, a plurality of secondary batteries are connected in series and configured and used to generate a voltage as high as a few hundreds of volts. Thus, an assembly in which a plurality of secondary batteries configured as described above are connected in series or in parallel is referred to as a battery module.

Hereinafter, a battery module 100 according to an exemplary embodiment of the present disclosure as described above is described in detail with reference to the drawings.

Figure 3:
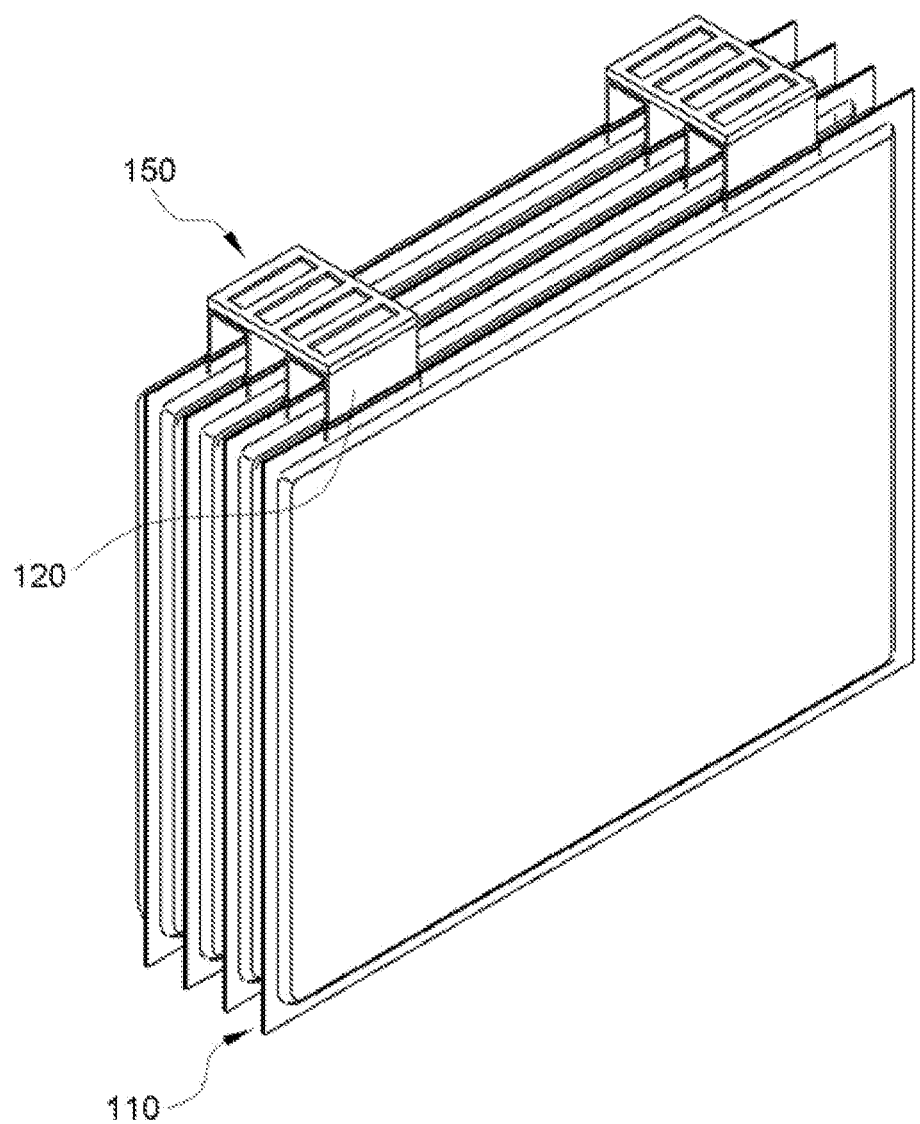
FIG. 3 is a perspective view illustrating a battery module according to an exemplary embodiment of the present disclosure.
Figure 4:
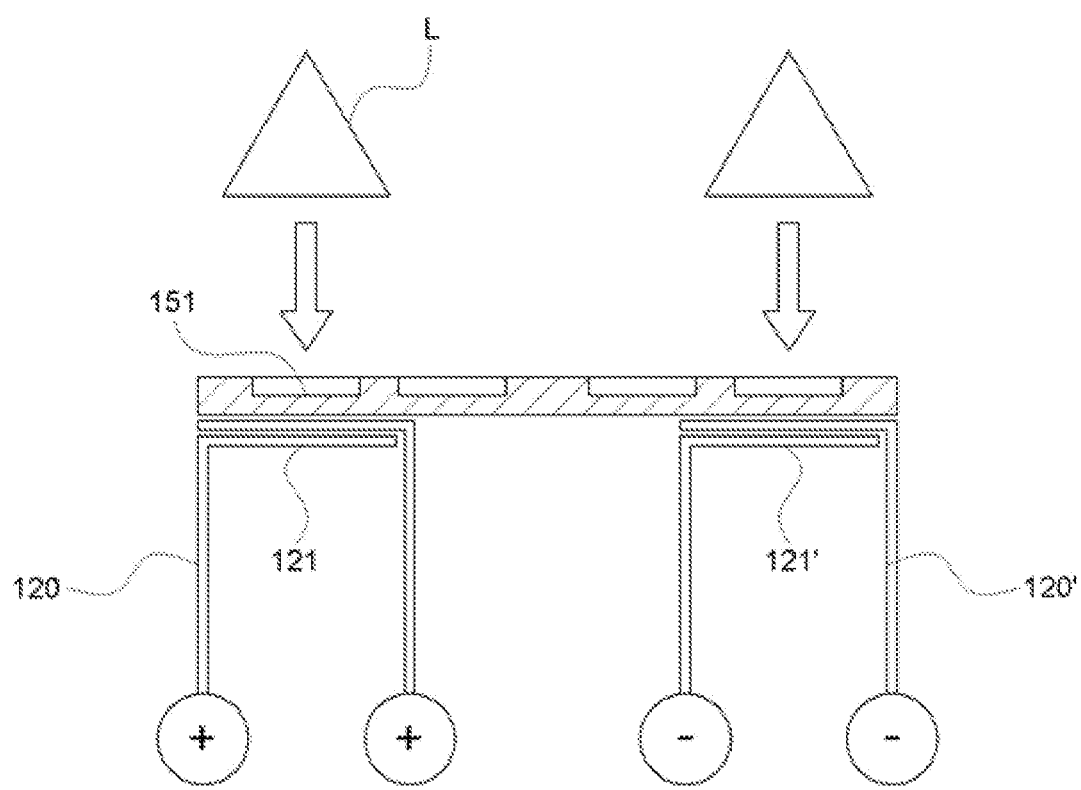
FIG. 4 is a view schematically illustrating a connection of electrode tabs using a laser welding according to the present disclosure.

FIG. 3 is a perspective view illustrating the battery module 100 according to an exemplary embodiment of the present disclosure, and FIG. 4 is a cross-sectional view schematically illustrating a process of connecting electrode tabs 120 of the battery module 100 according to an exemplary embodiment of the present disclosure using a laser welding.

As shown in the drawing, in the battery module 100, a plurality of secondary batteries 110 are stacked, and electrode tabs 120 included in each of the secondary batteries 110 are connected using a busbar 150. The battery module 100 according to the present exemplary embodiment is configured to reduce a weight and a volume of the battery module 100 by minimizing a number of busbars 150. Thus, after a pair of electrode tabs 120 to be connected is bent to face each other, the busbar 150 is disposed above an electrode tab bending portion 121, and the busbar 150 and the electrode tab bending portion 121 are connected using a laser welding, so that the battery module 100 is configured.

Here, the busbar 150 according to the present disclosure is configured to include a welding groove 151 recessed inwardly from a top surface to enhance a laser welding quality. In other words, as shown in FIG. 4, an average thickness of the busbar 150 is configured to be greater than a thickness of an electrode tab 120 so that the busbar 150 is applicable to a high-capacity secondary battery. Also, a thickness of the busbar 150 in which the welding groove 151 is formed is configured to be less than or equal to a thickness of an electrode tab 120, so as to prevent a reduction in the laser welding quality. In particular, the welding groove 151 is locally formed only in a welded portion of an electrode tab 120, to minimize a reduction in the average thickness of the busbar 150, and a laser welding is performed through the welding groove 151 to enhance a welding quality.

Figure 5:
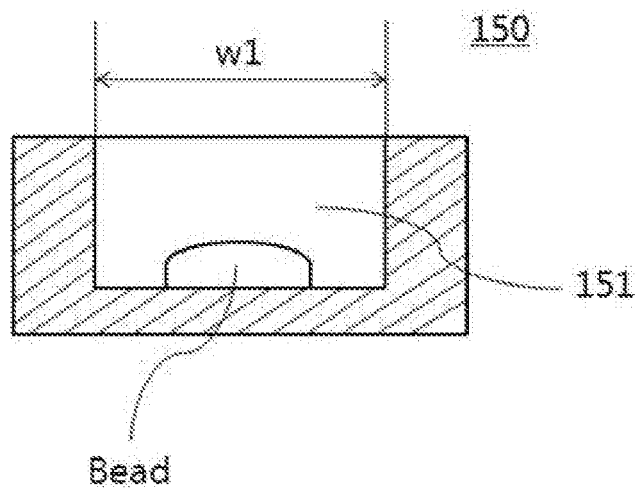
FIG. 5 is a cross-sectional view illustrating a welding groove in which a laser welding bead is formed (one-row welding).
Figure 6:
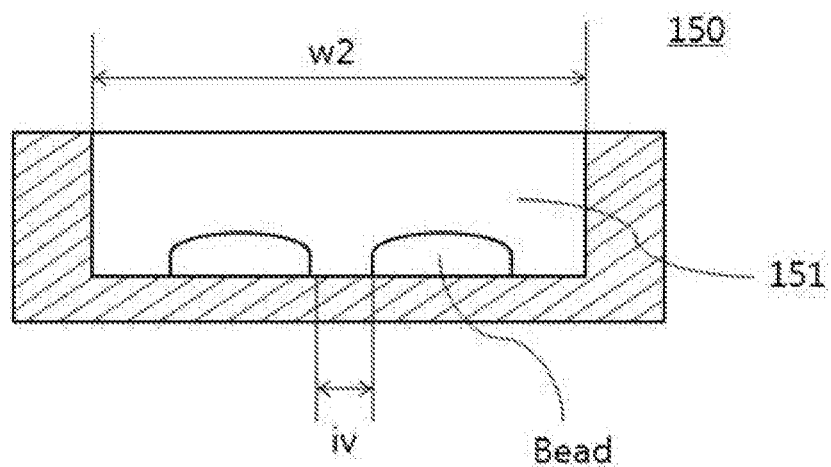
FIG. 6 is a cross-sectional view illustrating a welding groove in which laser welding beads are formed (two-row welding).

FIG. 5 is a cross-sectional view illustrating a welding groove 151 in which a laser welding bead is formed during a one-row welding, and FIG. 6 is a cross-sectional view illustrating a welding groove 151 in which laser welding beads are formed during a two-row welding.

As shown in the drawings, during the one-row welding, a width w1 of the welding groove 151 may range from 2 millimeters (mm) to 5 mm. When the width w1 of the welding groove 151 is less than 2 mm, it is not easy to secure a space for generation of a bead due to a welding, and accordingly a decrease in a welding quality is concerned. When the width w1 of the welding groove 151 is greater than 5 mm, an effect of increasing a cross-sectional area of the busbar 150 in comparison to the welding groove 151 becomes insignificant.

During the two-row welding, a width w2 of the welding groove 151 may range from 6 mm to 8 mm. In the case of the two-row welding, the welding groove 151 is formed to be wider without an increase in the width in proportion to the one-row welding, because an interval iv between beads formed during the two-row welding needs to be taken into consideration.

Hereinafter, a shape of the above-described busbar 150 according to an exemplary embodiment of the present disclosure will be described in detail with reference to the drawings.

Figure 7:
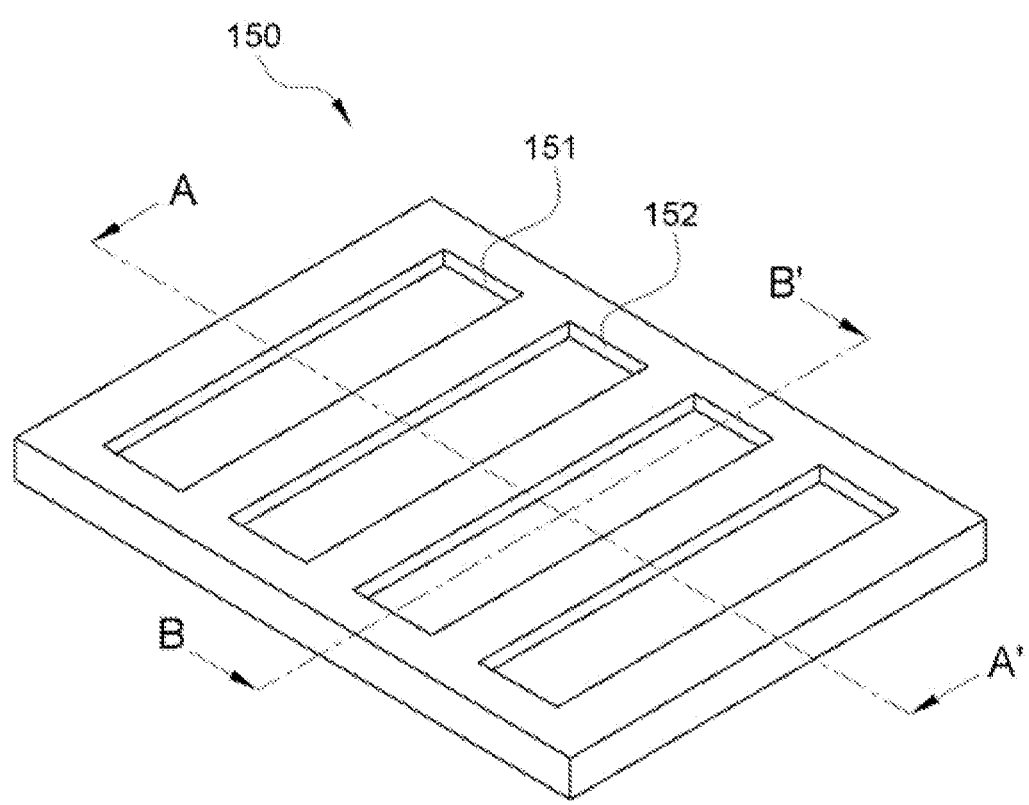
FIG. 7 is a perspective view illustrating a busbar according to an exemplary embodiment of the present disclosure.
Figure 8:
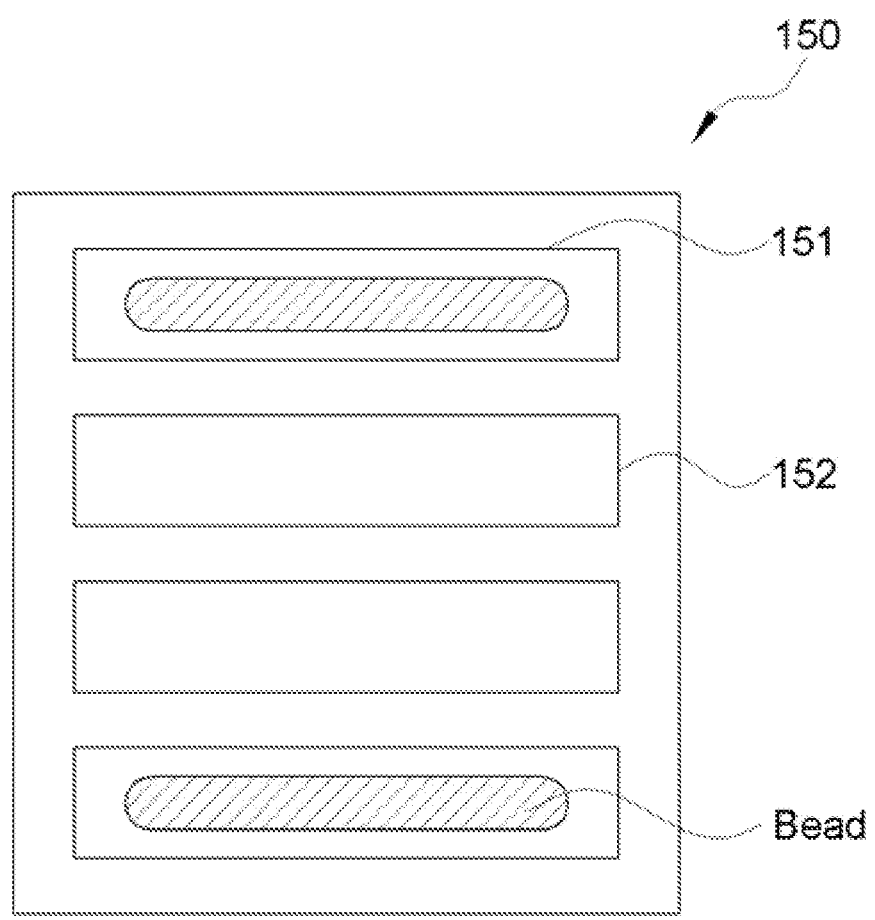
FIG. 8 is a plan view illustrating a busbar according to an exemplary embodiment of the present disclosure.
Figure 9:
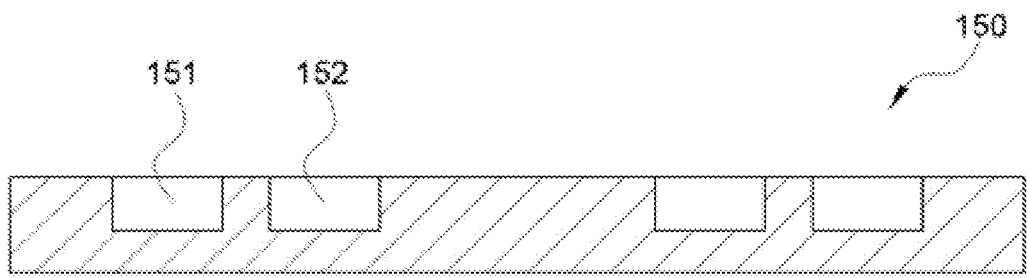
FIG. 9 is a cross-sectional view taken along line A-A' of FIG. 7.
Figure 10:
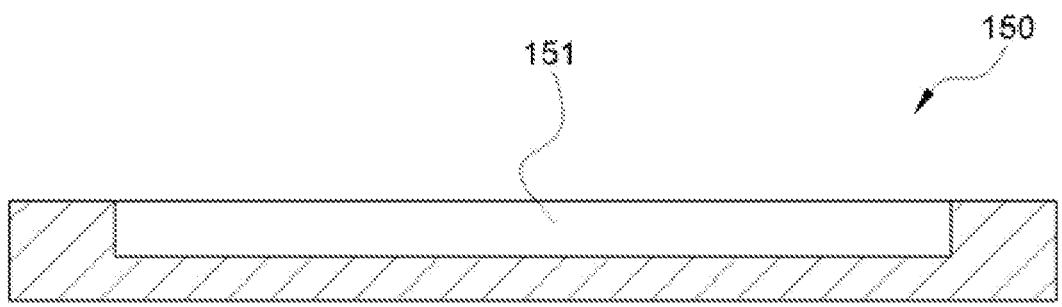
FIG. 10 is a cross-sectional view taken along line B-B' of FIG. 7.

FIG. 7 is an overall perspective view illustrating a busbar 150 according to an exemplary embodiment of the present disclosure, and FIG. 8 is a plan view illustrating a busbar 150 according to an exemplary embodiment of the present disclosure. FIGS. 9 and 10 are cross-sectional views of the busbar 150. FIG. 9 is a cross-sectional view of the busbar 150, taken in a width direction of a welding groove 151, and FIG. 10 is a cross-sectional view of the busbar 150, taken in a longitudinal direction of the welding groove 151.

As shown in the drawings, the busbar 150 has a shape of a plate with a predetermined thickness. As an example, the busbar 150 may be a plate. Also, the busbar 150 may be formed of a metal material as an example of a conductive material. The busbar 150 includes a plurality of welding grooves 151 and a plurality of heat dissipation grooves 152.

A welding groove 151 is configured to be recessed downwardly from a top surface of the busbar 150, and is formed in a longitudinal direction of an electrode tab 120 to have a predetermined width. More specifically, the longitudinal direction of the electrode tab 120 refers to a direction parallel to an edge portion of a secondary battery 110 from which the electrode tab 120 protrudes. Welding grooves 151 are individually formed in an electrode tab 120 of a secondary battery 110 disposed in one side of the busbar 150, and in an electrode tab 120' of a secondary battery 110' disposed in another side of the busbar 150.

Thus, as shown in FIG. 8, a laser welding bead formed along the welding groove 151 may be formed in a straight line in a longitudinal direction of an electrode tab 120. By forming the laser welding bead in the straight line in the longitudinal direction of the electrode tab 120 as described above, it is possible to securely connect electrode tabs as well as to enhance a welding quality.

Also, both longitudinal end portions of the welding groove 151 are spaced apart inwardly by a predetermined distance from ends of the buster 150 so that the welding groove 151 is locally formed on a welded portion only, thereby minimizing a reduction in an average thickness of the busbar 150.

In the busbar 150, a heat dissipation groove 152 having a similar shape to that of the welding groove 151 may be further formed in addition to the welding groove 151. The heat dissipation groove 152 is configured to be recessed downwardly from the top surface of the busbar 150, and is formed adjacent to the welding groove 151 in a longitudinal direction of the welding groove 151 to have a predetermined width. The heat dissipation groove 152 is configured to enhance a cooling performance of the busbar 150 by increasing an area of the top surface of the busbar 150.

Figure 11:
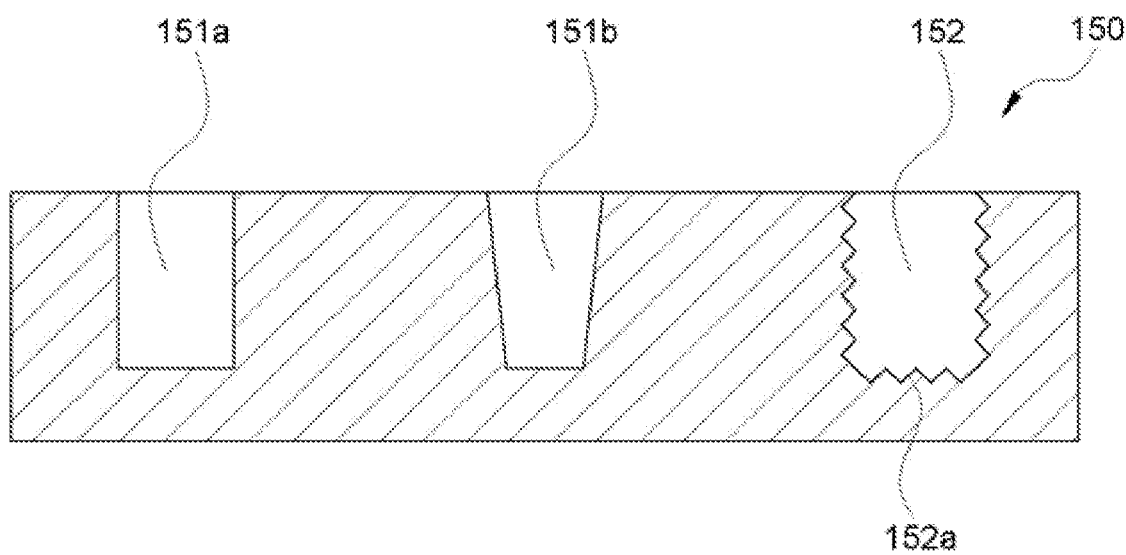
FIG. 11 is a cross-sectional view illustrating a welding groove and a heat dissipation groove according to another exemplary embodiment of the present disclosure.

FIG. 11 is a cross-sectional view illustrating a welding groove 151 and a heat dissipation groove 152 according to another exemplary embodiment of the present disclosure.

As shown in the drawing, a welding groove 151a basically having a rectangular shape is formed as a welding groove 151. In addition, a welding groove 151b having a trapezoidal shape may be formed to reduce a decrease in a thickness of the busbar 150. The welding groove 151b has a width decreasing downwardly. Furthermore, a welding groove 151c having a shape of "V" may be formed to extremely reduce the decrease in the thickness of the busbar 150.

Moreover, the heat dissipation groove 152 may further include an uneven portion 152a formed on an inner surface to further increase a surface area, as shown in the drawing.

Figure 12A:
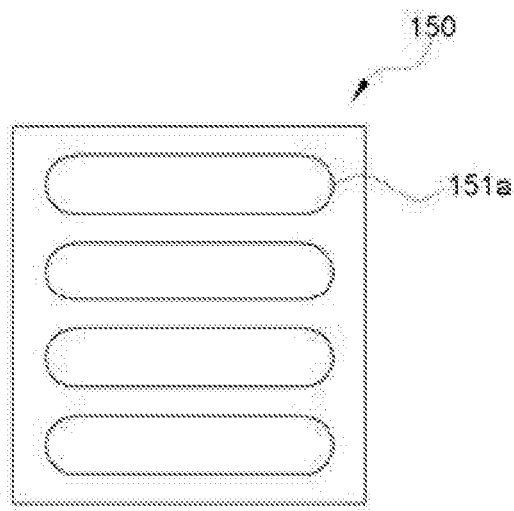
FIGS. 12A through 12C are plan views illustrating busbars according to various exemplary embodiments of the present disclosure.
Figure 12B:
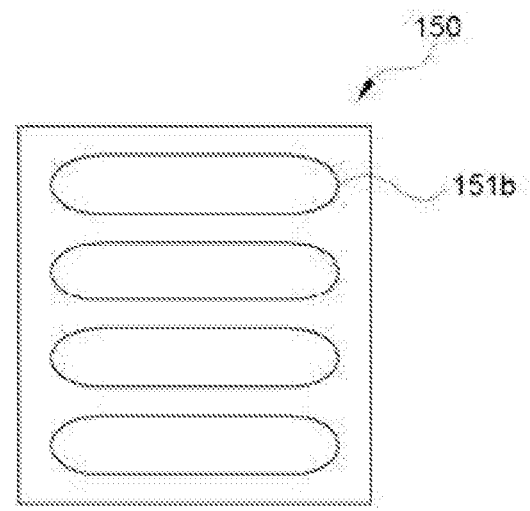
Figure 12C:
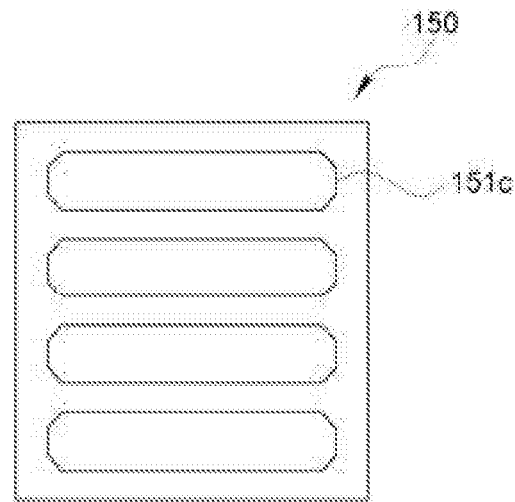

FIGS. 12A through 12C are plan views illustrating busbars 150 according to various exemplary embodiments of the present disclosure. A welding groove 151 formed in the busbar 150 basically has a rectangular planar shape as described above. However, in an example, both ends of a welding groove 151a may have hemispherical planar shapes, as shown in FIG. 12A.

In another example, both ends of a welding groove 151b may have elliptical planar shapes, as shown in FIG. 12B.

In still another example, both ends of a welding groove 151c may have square planar shapes, as shown in FIG. 12C.

A welding groove having the above-described shapes has an effect of increasing a cross-sectional area of the busbar 150 in comparison to a welding groove having a rectangular cross section.

According to exemplary embodiments of the present disclosure, in a battery module for a secondary battery, a thickness of a welded portion may be reduced while maintaining a total cross-sectional area of a busbar when electrode tabs of each of secondary batteries are connected in series or in parallel by a laser welding. Thus, the battery module may have an enhanced welding quality, and also may have an effect of being applicable to a high-capacity battery or a battery that is used for a long period of time.

The present disclosure should not be construed to being limited to the above-mentioned exemplary embodiment. The present disclosure may be applied to various fields and may be variously modified by those skilled in the art without departing from the gist of the present disclosure claimed in the claims. Therefore, it is obvious to those skilled in the art that these alterations and modifications fall in the scope of the present disclosure.

100: Battery module
110: Secondary battery
120: Electrode tab
150: Busbar
151: Welding groove
152: Heat dissipation groove

What is claimed is:

1. A battery module comprising:
a plurality of secondary batteries;
an electrode tab extending from each of the plurality of secondary batteries and including an electrode tab bending portion; and
a busbar coupled with the electrode tab bending portion,
wherein the busbar comprises a welding groove formed to be recessed in a welded portion and configured to perform a welding of an electrode tab and a neighboring electrode tab, and
wherein a thickness of the busbar in which the welding groove is formed is less than or equal to a thickness of the electrode tab, and a thickness of the busbar in which the welding groove is not formed is greater than a thickness of the busbar in which the welding groove is formed.

2. The battery module of claim 1, wherein a plurality of electrode tabs are coupled with one busbar, and at least one welding groove is formed on the one busbar.

3. The battery module of claim 1, wherein the welded portion of the welding groove is formed along the electrode tab.

4. The battery module of claim 1, wherein the plurality of secondary batteries are a pouch type cell in which an electrode tab protrudes and is bent to form the electrode tab bending portion.

5. The battery module of claim 1, wherein
the electrode tab and the neighboring electrode tab comprise the electrode tab bending portion respectively and face each other at the electrode tab bending portion,
the busbar is welded with the electrode tab bending portion using a laser.

6. The battery module of claim 1, wherein the welding groove is formed to have a predetermined width, in a longitudinal direction of the electrode tab.

7. The battery module of claim 6, wherein the welding groove is formed so that both longitudinal end portions of the welding groove are spaced apart inwardly by a predetermined distance from end portions of the busbar.

8. The battery module of claim 1, wherein the busbar further comprises a heat dissipation groove formed to be recessed adjacent to the welding groove.

9. The battery module of claim 6, wherein a cross section of the welding groove has a rectangular shape, or a trapezoidal shape having a width decreasing downwardly.

10. The battery module of claim 8, wherein the heat dissipation groove has an uneven portion formed on an inner surface.

11. The battery module of claim 6, wherein at least one laser welding bead is formed along the welding groove.

12. The battery module of claim 1, wherein an average thickness of the busbar is greater than a thickness of the electrode tab.

* * * * *